No. 719,710. PATENTED FEB. 3, 1903.
W. M. WOLCOTT.
MACHINE FOR SHAPING GLASS.
APPLICATION FILED JAN. 22, 1902.
NO MODEL. 11 SHEETS—SHEET 1.

Witnesses: Inventor:

No. 719,710. PATENTED FEB. 3, 1903.
W. M. WOLCOTT.
MACHINE FOR SHAPING GLASS.
APPLICATION FILED JAN. 22, 1902.
NO MODEL. 11 SHEETS—SHEET 3.

Witnesses:
Ira D. Perry
F. G. Weir

Inventor:
Willie M. Wolcott

No. 719,710. PATENTED FEB. 3, 1903.
W. M. WOLCOTT.
MACHINE FOR SHAPING GLASS.
APPLICATION FILED JAN. 22, 1902.
NO MODEL. 11 SHEETS—SHEET 4.

Witnesses:

Inventor:

No. 719,710. PATENTED FEB. 3, 1903.
W. M. WOLCOTT.
MACHINE FOR SHAPING GLASS.
APPLICATION FILED JAN. 22, 1902.

NO MODEL. 11 SHEETS—SHEET 6.

Witnesses: Inventor:

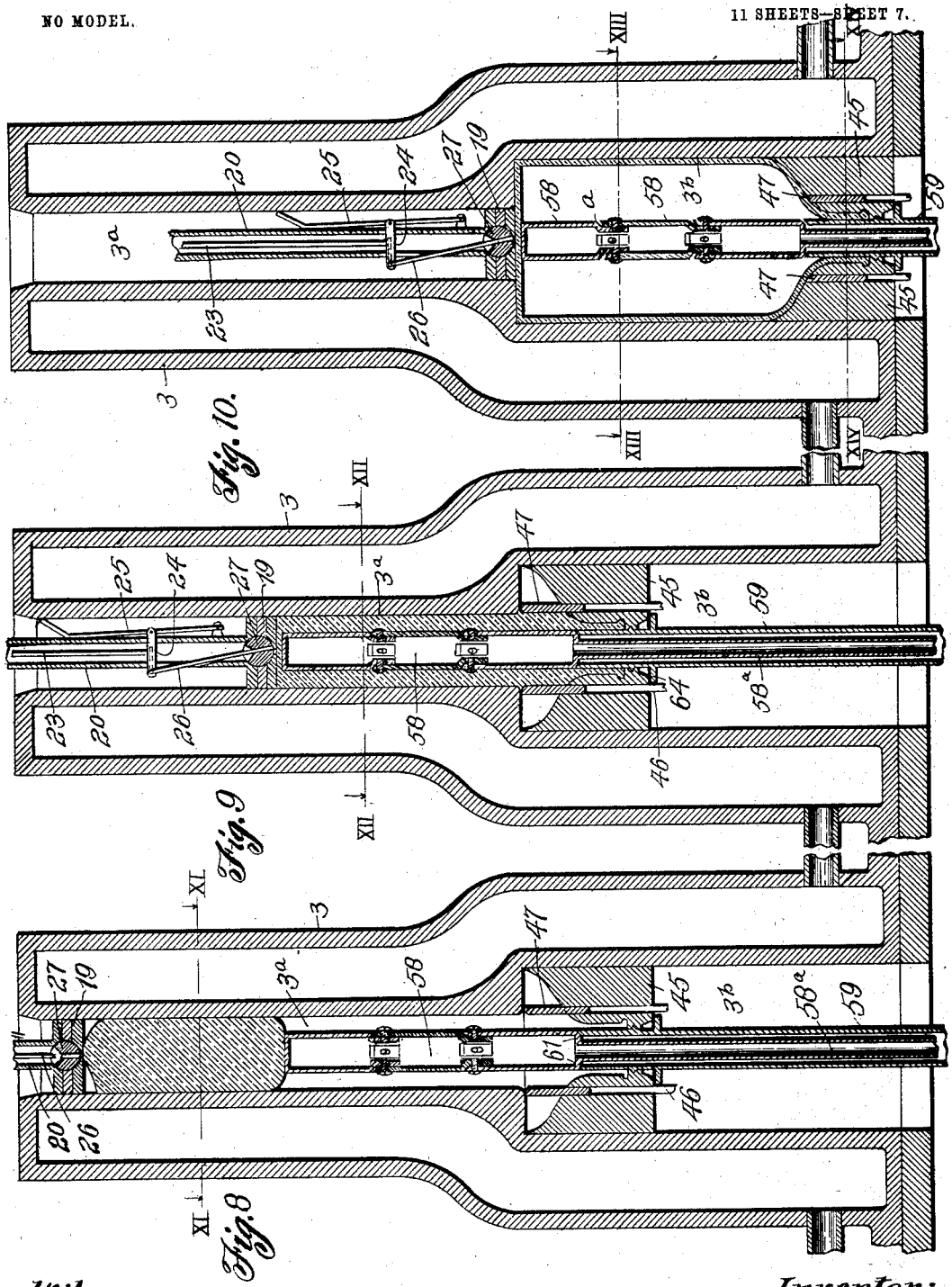

No. 719,710. PATENTED FEB. 3, 1903.
W. M. WOLCOTT.
MACHINE FOR SHAPING GLASS.
APPLICATION FILED JAN. 22, 1902.
NO MODEL. 11 SHEETS—SHEET 8.
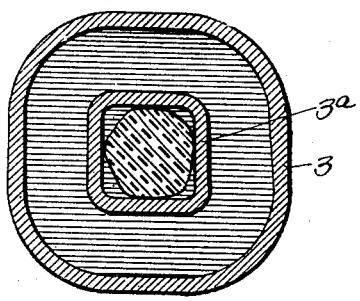
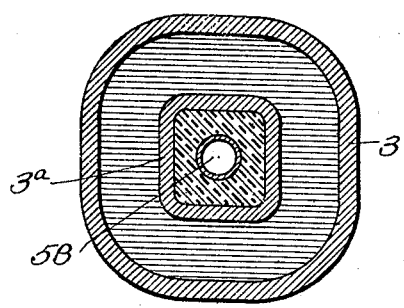
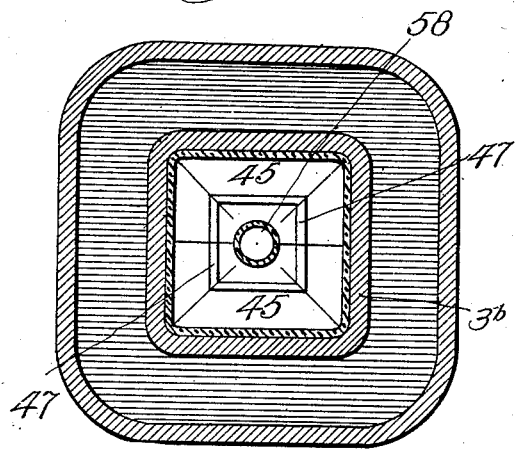
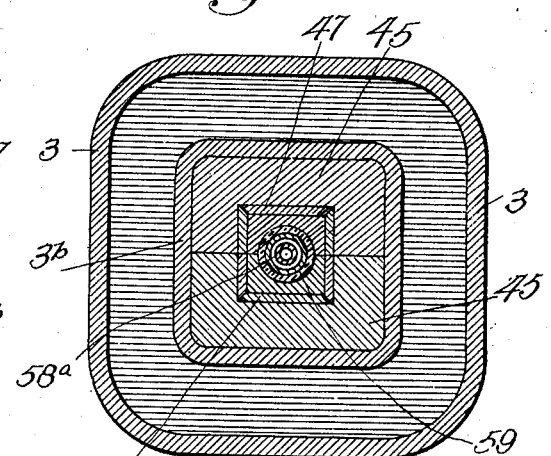
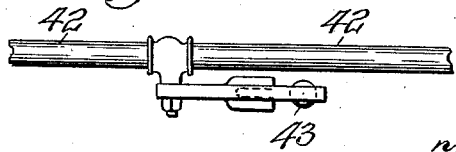
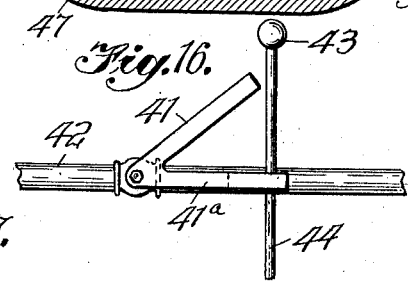
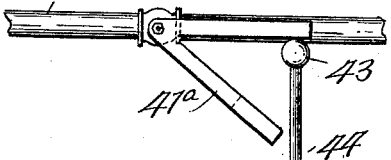
Witnesses:
Inventor:

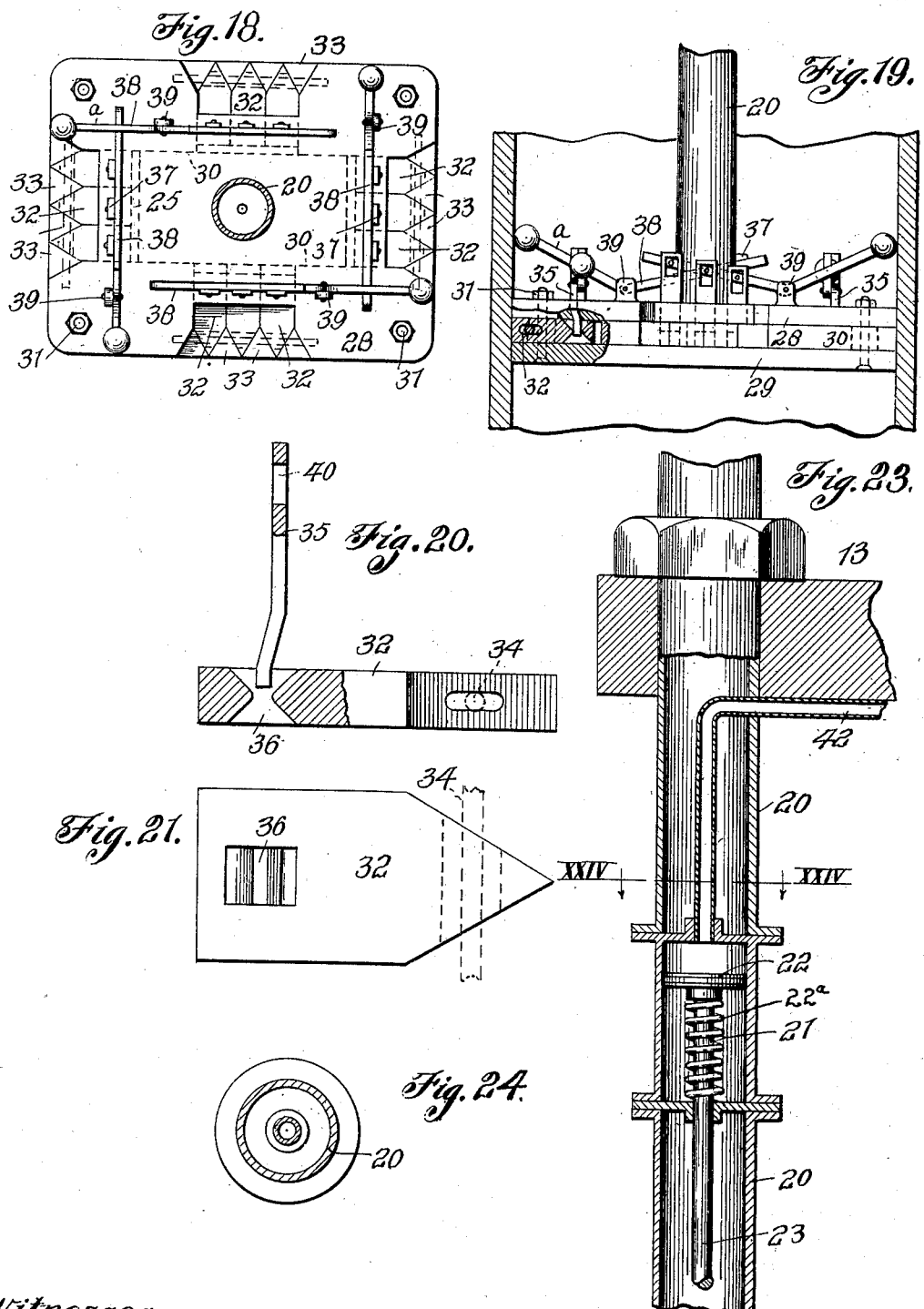

No. 719,710. PATENTED FEB. 3, 1903.
W. M. WOLCOTT.
MACHINE FOR SHAPING GLASS.
APPLICATION FILED JAN. 22, 1902.
NO MODEL. 11 SHEETS—SHEET 10.

Witnesses:
Ira D. Perry
J. B. Weir

Inventor:
William M. Wolcott

No. 719,710. PATENTED FEB. 3, 1903.
W. M. WOLCOTT.
MACHINE FOR SHAPING GLASS.
APPLICATION FILED JAN. 22, 1902.
NO MODEL. 11 SHEETS—SHEET 11.
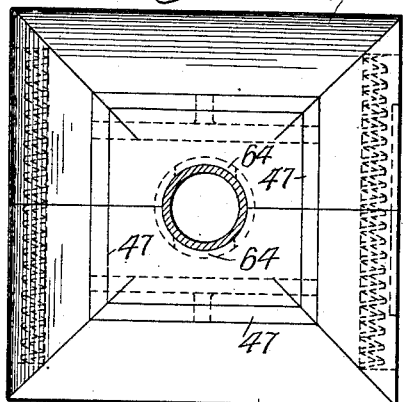
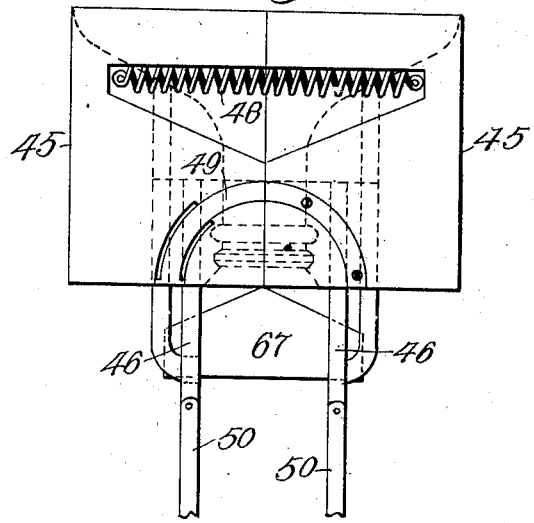
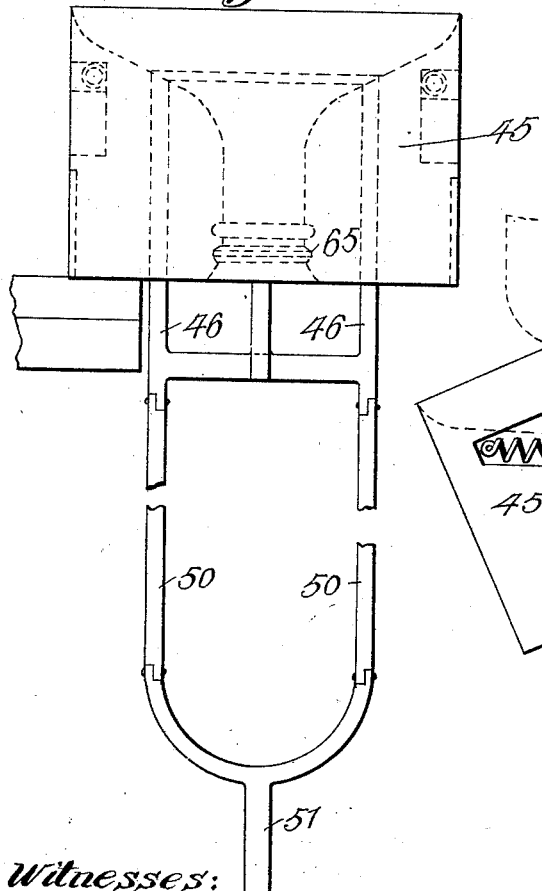
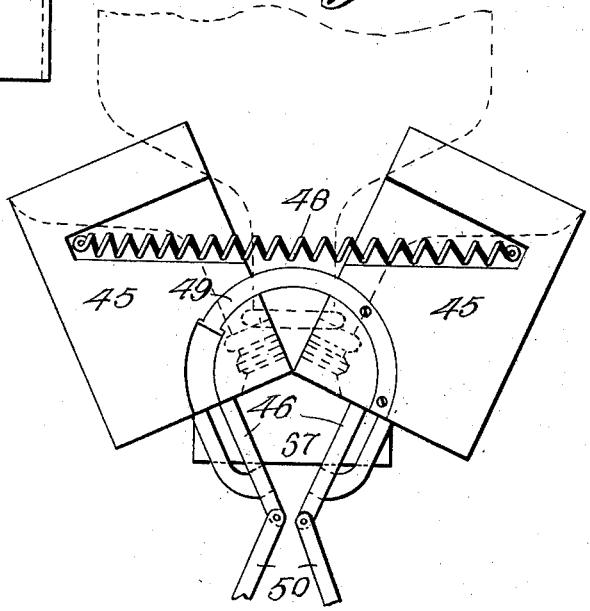
Witnesses:
Inventor:
Willis M. Wolcott

UNITED STATES PATENT OFFICE.

WILLIE M. WOLCOTT, OF CHICAGO, ILLINOIS, ASSIGNOR TO WOLCOTT GLASS MACHINE COMPANY, OF WHEELING, WEST VIRGINIA.

MACHINE FOR SHAPING GLASS.

SPECIFICATION forming part of Letters Patent No. 719,710, dated February 3, 1903.

Application filed January 22, 1902. Serial No. 90,796. (No model.)

*To all whom it may concern:*

Be it known that I, WILLIE M. WOLCOTT, a citizen of the United States, residing at Chicago, in the county of Cook and State of Illinois, have invented or discovered certain new and useful Improvements in Machines for Shaping Glass, of which improvements the following is a specification.

The invention described herein relates to certain improvements in the manufacture of hollow articles, such as jars or bottles, by a combined pressing and blowing action; and the invention has for its object a construction of mechanism whereby a blank is produced by a pressing operation and then forced from the pressing portion of the mold into the blow-mold and during such transfer the blank is expanded by blowing to the final shape of the completed article, such expansion by blowing being progressive as the blank advances into the blow-mold.

The invention is hereinafter more fully described and claimed.

Figure 1:
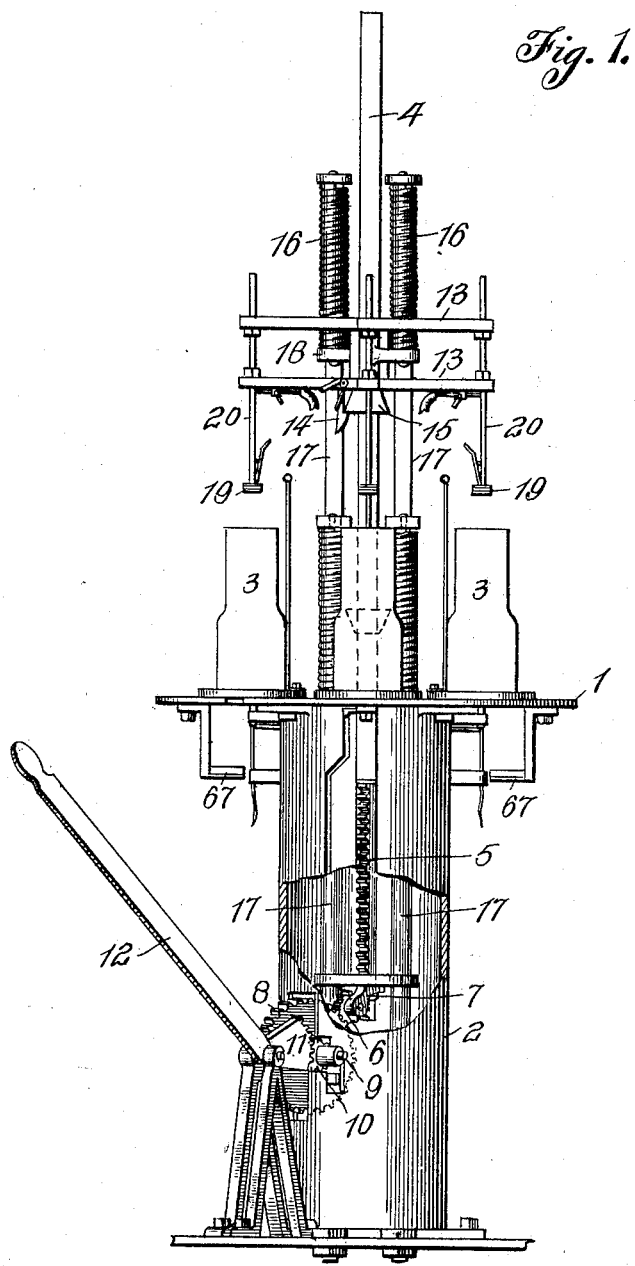
Figure 2:
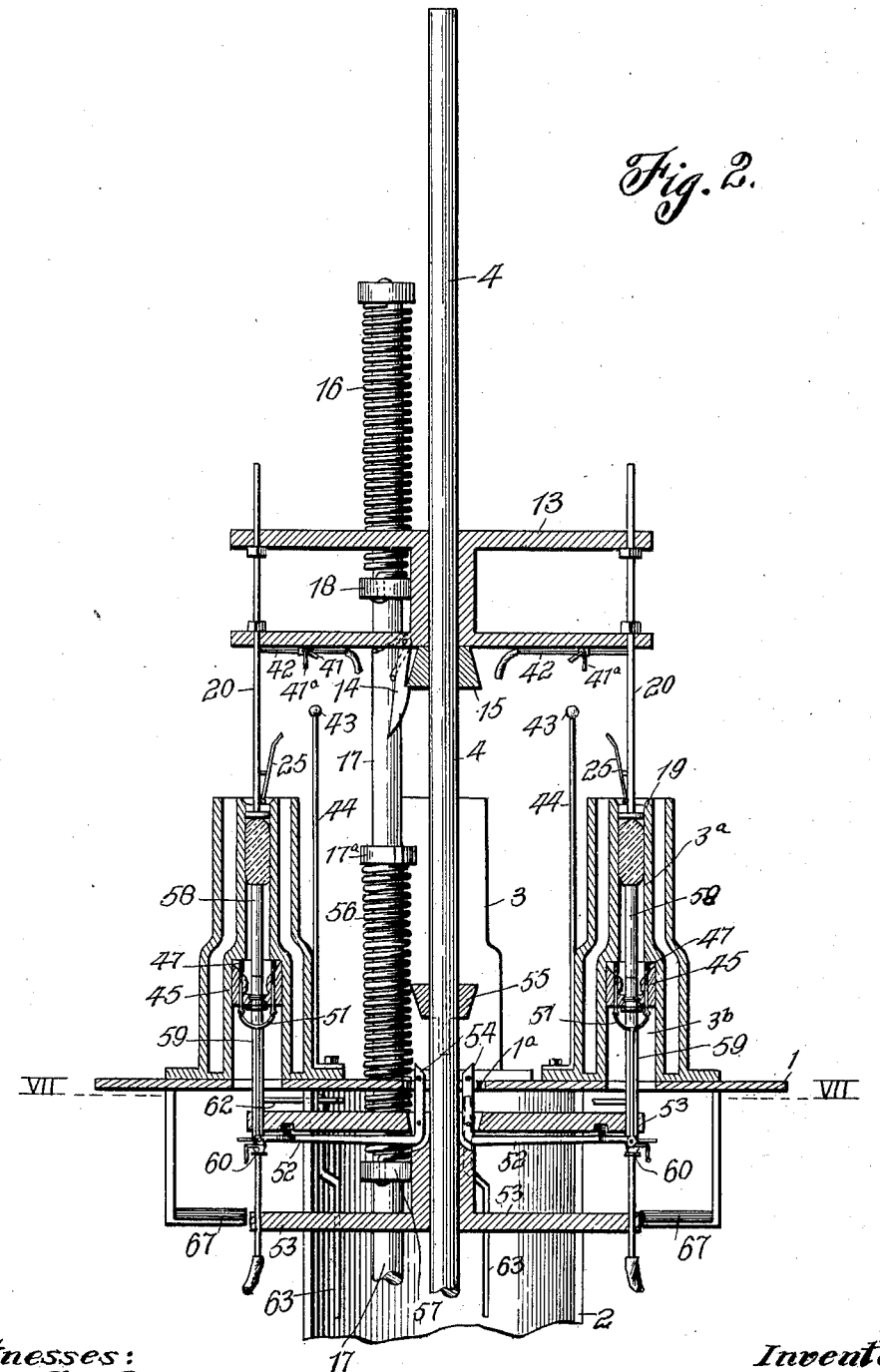
Figure 3:
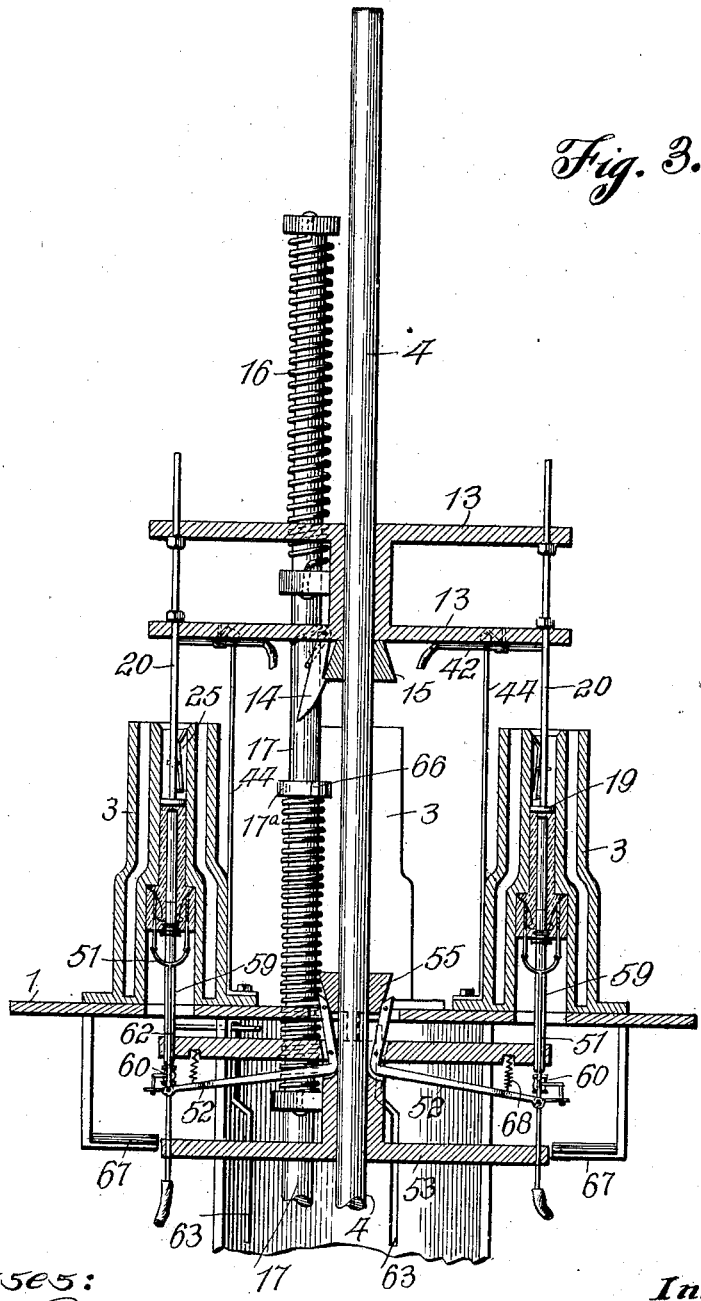
Figure 4:
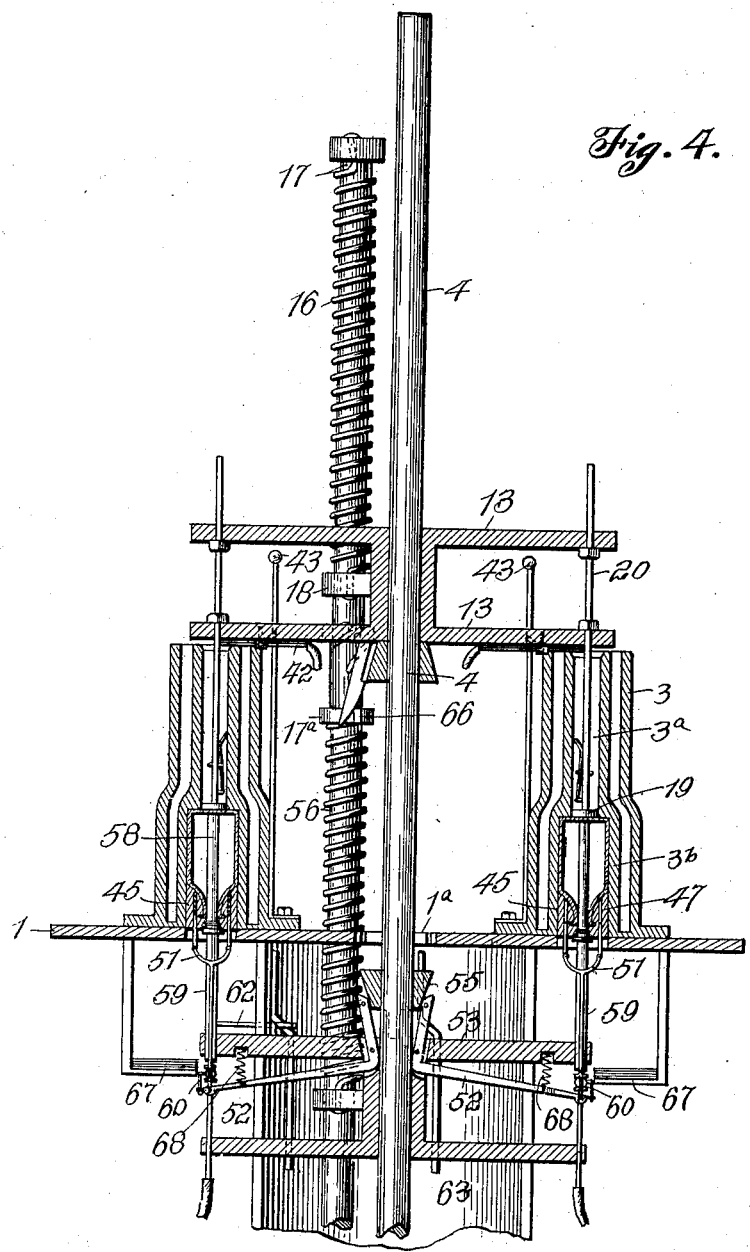
Figure 5:
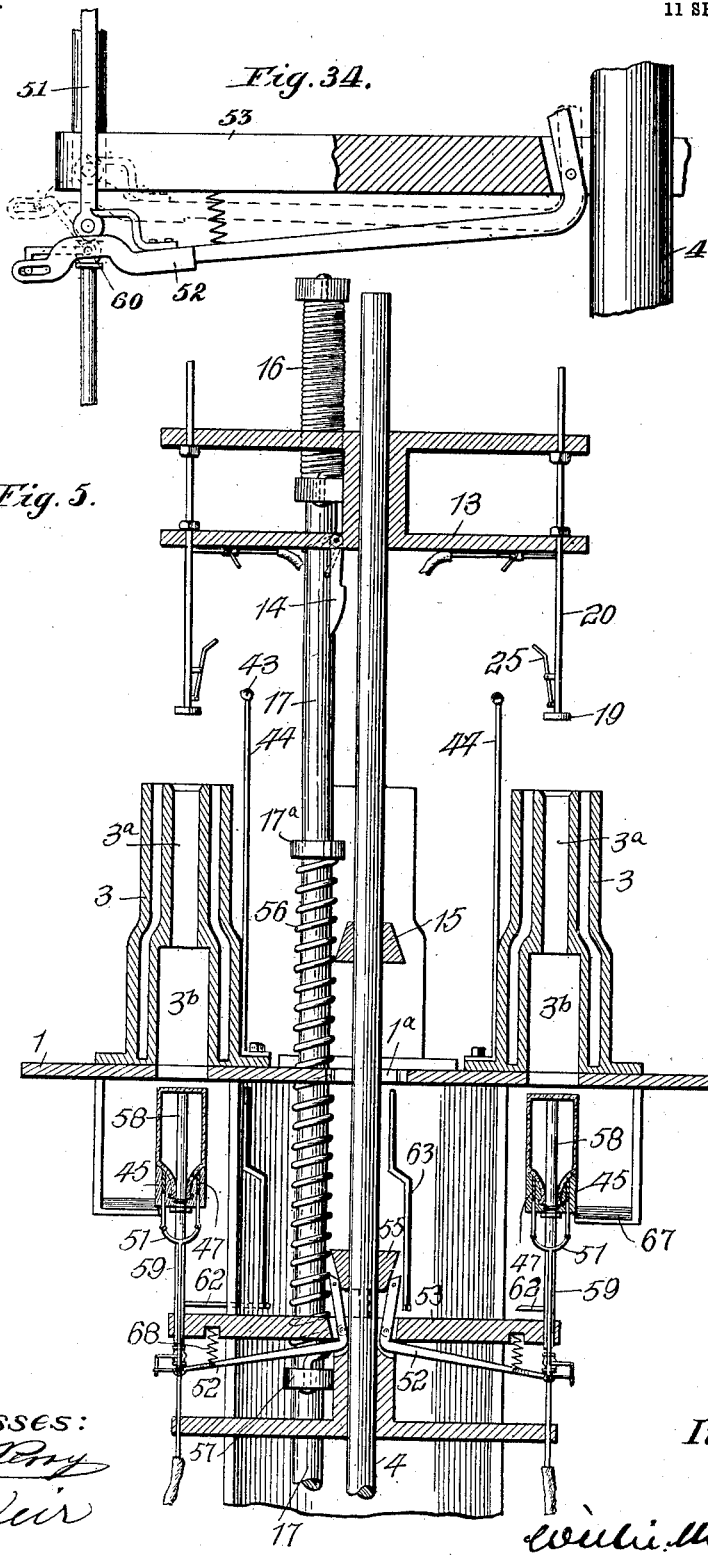
Figure 6:
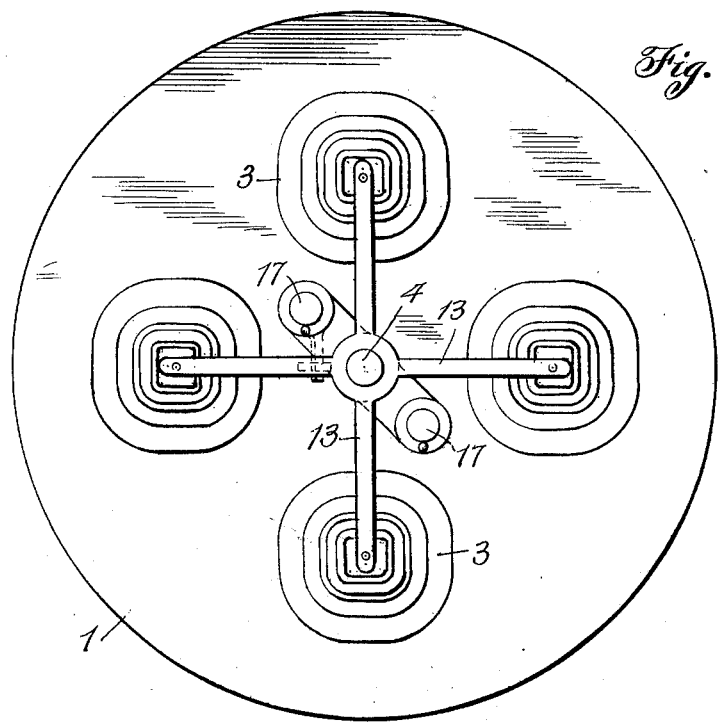
Figure 7:
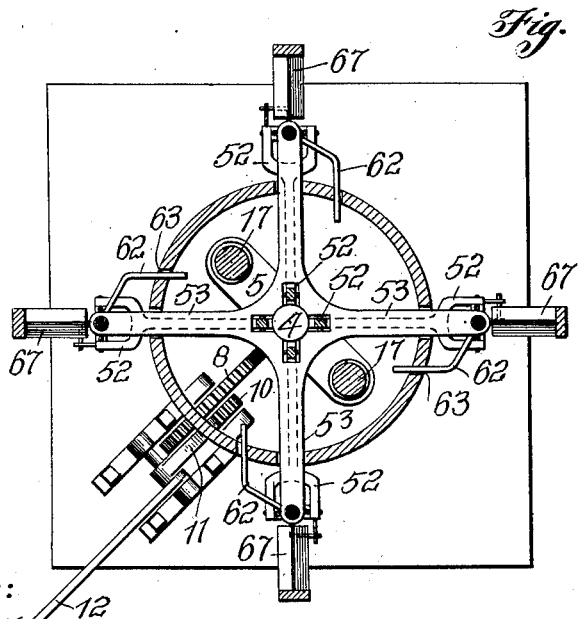
Figure 22:
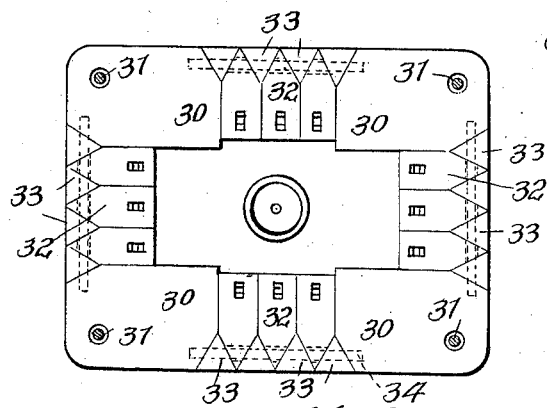
Figure 27:
Figures 25, 26, 28:
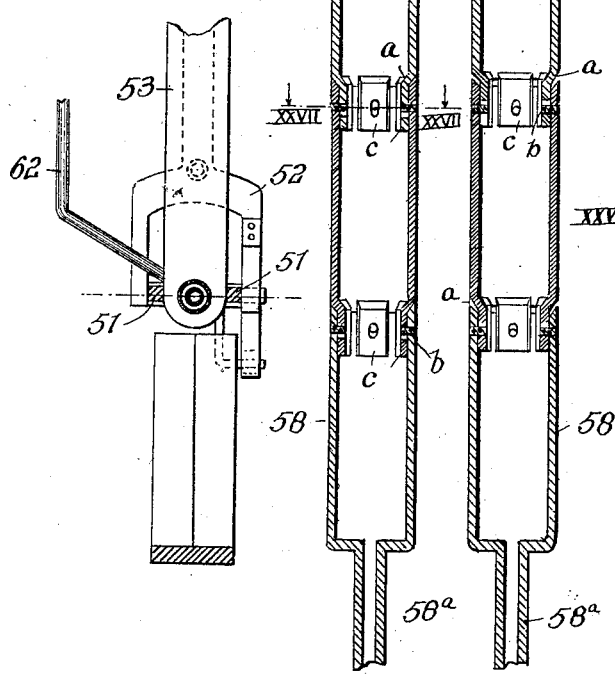
Figure 29:
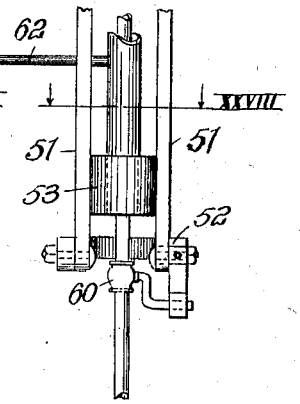

In the accompanying drawings, forming a part of this specification, Figure 1 is a view in elevation of my improved glass-shaping mechanism, showing the several parts in the positions they occupy when the glass is placed within the mold. Fig. 2 is a sectional elevation of the upper portion of the press, showing the position of the articles after the glass has been placed in the pressing-mold and the upper plunger in contact with the glass. Fig. 3 is a view similar to Fig. 2, showing the position of the several parts after the glass has been pressed to shape to form the blank. Fig. 4 is a view similar to Figs. 2 and 3, showing the position of the parts after the blank has been expanded to fill the blow-mold. Fig. 5 is a view similar to Figs. 2, 3, and 4, showing the position of the several parts when the completed article has been withdrawn from the blow-mold and the upper or pressing plunger raised to initial position. Fig. 6 is a top plan view of the machine. Fig. 7 is a horizontal section on a plane indicated by the line VII VII, Fig. 2. Figs. 8, 9, and 10 are detail views, on a large scale, showing the several steps illustrated in Figs. 2, 3, and 4. Figs. 11, 12, 13, and 14 are sectional views on planes indicated by the lines XI XI, XII XII, XIII XIII, XIV XIV of Figs. 8, 9, and 10, respectively. Figs. 15, 16, and 17 are detail views, on a large scale, illustrating the valve and its operating mechanism whereby the glass-valve in the pressing-plunger is controlled and operated. Fig. 18 is a plan view of the upper pressing-plunger. Fig. 19 is a view, partly in section and partly in elevation, of the plunger, showing it in position in the pressing-mold. Figs. 20 and 21 are detail views, on a large scale, of portions of the pressing-plunger. Fig. 22 is a plan of the upper pressing-plunger, the top plate being removed. Fig. 23 is an enlarged detail view of the stem of the upper pressing-plunger, showing the fluid-pressure cylinder and piston arranged therein. Fig. 24 is a transverse section on the line XXIV XXIV, Fig. 23. Figs. 25 and 26 are sectional views, on an enlarged scale, of the piercing-pin and blowing-nozzle. Fig. 27 is a transverse section on a plane indicated by the line XXVII XXVII, Fig. 25. Figs. 28 and 29 are detail views, on an enlarged scale, of the mechanism controlling the flow of fluid-pressure into and out of the article being blown, Fig. 28 being a section on the plane indicated by the line XXVIII XXVIII, Fig. 29. Fig. 30 is a side elevation of the neck-forming portion of the mold and its opening support or stop. Fig. 31 is a similar view of the neck-forming mold at right angles to the view shown in Fig. 30. Fig. 32 is a top plan view of the neck-forming mold. Fig. 33 is a view similar to Fig. 30, showing the neck-forming mold open to permit of the removal of the article; and Fig. 34 is a detail view illustrating the connection of a curtain-wall of the mold with its operating-lever.

In the practice of my invention the mold-supporting table 1 is secured upon a suitable base or standard 2 and one or more molds 3 are secured upon its upper face. A vertically-arranged operating-shaft 4 passes up through the mold-table, and on its lower end is formed or secured a rack-bar 5, intermeshing with a pinion 6, carried by a bracket 7 and adapted to intermesh with a gear-wheel 8, carried by a counter-shaft 9. On this counter-shaft is mounted a pinion 10, adapted to intermesh with a toothed segment 11, which can be shifted by a lever 12 or other suitable means. A cross-head 13 is mounted on the shaft 4 and is detachably connected thereto by a dog 14, pivotally mounted on the cross-head and adapted to engage a collar or abutment 15, secured to the vertical shaft. This cross-head 13 is normally held in a raised position by means of springs 16, surrounding supporting-rods 17 and connected at their ends to said rods and to lugs or ears 18, extending from the cross-head. Pressing-plungers, consisting of heads 19 and stems 20, are secured to the cross-head 13, so as to move therewith, the number of such plungers corresponding to the number of molds on the mold-table. As clearly shown in Fig. 23, the stems 20 are made tubular, and portions of such tubular stems are constructed, by means of transverse diaphragms, to form fluid-pressure cylinders 21, in which are arranged pistons 22, having stems 23, extending down and connected to levers 24, as shown in Figs. 9 and 10. These levers 24 have one end pivotally connected to arms 25, pivotally mounted in lugs extending from the stems 20 and having their upper ends bent outwardly, as shown, for a purpose hereinafter described. The free ends of the levers 24 are connected to rods 26, whose lower ends project down into ball-valves 27 in the pressing-heads 19 and are adapted, as hereinafter described, to close the passage through said balls and also to shift the same.

As shown in Figs. 18, 19, 20, 21, and 22, the upper pressing-head consists of upper and lower plates 28 and 29 of dimensions and contour adapted to fit freely in the pressing portion 3ª of the mold. As this portion is liable to expand with heat, it is desirable in order to prevent glass squeezing past the pressing-head to provide means whereby a tight joint may be formed at all times between the pressing-head and the sides of the mold. To this end movable pieces 30 are arranged between the plates 28 and 29, said plates having openings therethrough for the passage of bolts 31, whereby the upper and lower plates 28 and 29 are connected together, said openings in the pieces 30 being made sufficient size to allow of the movement of said pieces in all directions. Between the blocks 30 are arranged a series of expanding-blocks 32, free to move in and out, as hereinafter described. The outer ends of these blocks 32 are V-shaped, and in the recesses thus formed between adjacent points of the blocks 32 are arranged wedges 33, which are held in proper relation to the movable pieces 30 by means of pins 34, passing through the wedges 33 and their ends projecting into the pieces 30, as clearly shown in Figs. 18 and 22. These pins 34 hold the wedges 33 as against any outward movement except with the pieces 30, but permit said wedges to move back and forth along the pins. Where the pins 34 pass through the expanding-blocks 32 the latter are slotted, as clearly shown in Figs. 20 and 21, so as to permit the outward and inward movements of these expanding-blocks independent of the wedges 33. These blocks are adapted to be shifted in and out by means of keys 35, having their lower ends bent, as shown in Figs. 19 and 20, and extending down into transverse slots 36 in the rear end of the expanding-blocks 32. The upper ends of these keys 35 extend into guides 37, formed on or secured to the upper plate 28 of the pressing-head, and the keys are adapted to be raised and controlled in their downward movement by means of levers 38, pivotally mounted on lugs 39 on the upper plate 28 and having their outer ends extending sufficiently far to engage and be shifted by the pressing-mold as the pressing-head is moved down into the same. The levers are operatively connected to the keys 35 by means of pins projecting into slots 40, formed in the upper ends of the keys 35. When the presser-head is raised to normal position, and therefore clear of the mold, the weights on the outer ends of the levers 38 will raise the inner ends of the latter and through them the keys 35 to the position shown in Fig. 20. As the presser-head moves down into the mold the outer ends of these levers 38 will strike against the walls of the mold, raising such outer ends and lowering the inner ends, so that the keys 35 will be free to move down into the slots 36 and by reason of their weight force the expanding-blocks outwardly. As the V-shaped ends of the blocks 32 are crowded between the wedges 33 they will tend to force the latter apart and be forced apart by the wedges if the expanding-pieces 30 are free to move, so that by the operation of these keys the presser-head will be caused to have a peripheral contact with the side walls of the mold. As clearly shown in Figs. 8, 9, and 10, an opening is formed through the presser-head, the walls of such opening being so shaped as to form a seat for the ball-valve 27. These parts should be so arranged that the under surface of the presser-head will be approximately tangential to the ball, so that a regular and even surface will be formed entirely across the operative face of the pressing-head. As the cross-head 13 is moved down by the operation of the lever 12 the presser-heads enter the upper portions 3ª of the mold and push down any glass which may be therein. During this initial movement of the pressing-head the ball-valve 27 is in such position as to permit of the escape of any surplus glass into the opening of the ball. After a predetermined movement of the cross-head and the several pressing-heads an arm 41 on the stem of a valve in a pipe 42, adapted to conduct fluid-pressure to the cylinder 21 of the stem 20, strikes against a stop or abutment 43, suitably supported on the frame of the machine in this instance by a rod 44, secured to the mold-bed 1, thereby shifting the valve and allowing fluid-pressure into the cylinder, thus forcing down the piston 22, and thereby shifting the valve-rod 26 and closing the opening through the ball-valve 27. By a further movement of the cross-head and pressing-heads the outwardly-bent ends of the arms 25 strike the upper end of the pressing-mold and force the arms inwardly, thereby shifting the lever 24 and with it the rod 26 and ball-valve 27, so as to bring the opening through the ball out of line with the opening through the presser-head and preventing any further escape of glass from the mold, as shown in Figs. 9 and 10.

The neck forming or shaping part of the mold is formed in two sections 45, in the inner faces of which are cut or formed the matrices for the neck and shoulder of the article, as shown in Figs. 30 and 33, inclusive. Each of these sections is carried by the escape-pipe 59, and curtain-plates 47 are movably arranged in the sections 45 and have their lower ends connected to rods 46, adapted to shift said plates out of the sections to form walls of the pressing-mold, as shown in Figs. 8 and 9. The upper ends of the sections 45 are held together normally by springs 48, and the sections are guided in their opening and closing movements by curved plates or strips 49, arranged in grooves in the sides of the sections. When the parts of the mechanism are in normal position, as shown in Figs. 2, 8, and 9, the neck-forming sections extend up into the blowing portion $3^b$ of the mold and the curtain-walls 47 project out of the sections, so as to bear against shoulders at the junction of the pressing and blowing portions of the mold. As shown in Figs. 2, 3, 4, 30, 31, and 33, the rods 46 have their lower ends pivotally connected to links 50, which in turn are similarly connected to the arms of yokes 51, the stem portions of said yokes being connected, as shown in Figs. 2, 3, 4, 28, and 29, to the outer ends of bent levers 52. These levers are pivotally mounted in the lower cross-head 53, and the inner ends of said levers project upward through the slots $1^a$ in the mold-table when the parts of the mechanism are in normal position. Pins 54 are carried by the upper ends of these levers, and when in normal position the pins will lock the cross-head and the mold-table. As the operating-shaft 4 descends a wedge-block 55, carried by the shaft, will impinge against the upper ends of these levers, forcing them outwardly, bringing the pins 54 into line with enlarged portions of the slots in the table, so that as the shaft and wedge-block continue to move downwardly the cross-head will be free to be shifted. This cross-head is normally held in upper position by means of springs 56, having their upper ends connected to collars $17^a$ on the guide-rods 17 and the lower ends connected to lugs 57, secured to the lower cross-head 53. The wedge-blocks 55 are provided with downward extensions, as shown in dotted lines in Figs. 2, 3, and 4, which as the upper ends of the levers are forced to unlock-ing position will strike against the cross-head and on the further downward movement of the vertical shaft 4 will cause the cross-head to move therewith.

In the operation of the mechanism the lower cross-head will not be unlocked until after the presser-heads 19 have entered the upper ends of the pressing portion $3^a$ of the mold and forced the glass contained therein down around a piercing-pin or plunger 58, which is carried by the blowpipe $58^a$, which in turn has its lower end connected or secured to the lower arm of the cross-head 53, so as to move therewith. As soon as the parts have reached the position shown in Fig. 3 and the glass has been pressed around the plunger or pin 58 the wedge-block 55 will force the upper ends of the levers 52 outwardly, unlock the cross-head, and by the continued movement of the shaft 4 the two cross-heads will thereafter move down in unison with each other, carrying the pressed blank between them. By the shifting of the levers 52 the curtain-walls 47 will be drawn down into the neck-forming sections 45, and by the same movement of the levers arms on the valves 60 in the blowpipe will be shifted by pins on the levers 52 to open the valves, so that air under pressure can enter by the blowpipe and piercing-pin 58 into the interior of the press-blank. As clearly shown in Figs. 25 and 26, the piercing-pin is formed of two or more parts or sections, the lower end of each section being contracted to fit into the upper end of the next lower section, so that the pin will present a smooth external surface. The contracted portions of the sections are slotted, as shown, so that when a section is moved down so that its upper end moves away from the seat or shoulder $a$ of the adjacent section air under pressure can escape from the piercing-pin into the blank being blown. The several sections are held together with a freedom of movement on each other by pins $b$ of one section projecting in slots in the tongues $c$, formed by slitting the contracted lower ends of the sections, as described. When the glass is pressed around the piercing-pin, the sections are forced together, causing the ends of the sections to bear against shoulders $a$ of the adjacent sections, forming a tight joint. When the lower cross-head 53 is moved down, as stated, the pull on the blowpipe $58^a$ will cause the sections to separate, permitting when the controlling-valve 60 is opened the flow of fluid-pressure into the blank. The separation of the sections of the piercing-pin will be assisted by the pressure of air within the pin.

As clearly shown in Figs. 8, 9, 10, 25, and 26, the piercing-pin 58 is carried by the blowpipe $58^a$, which, as before stated, is connected to the lower arm of the cross-head 53, and this pipe is surrounded by the escape or outlet pipe 59, which is connected to the upper arm of the cross-head 53. The upper end of the outlet-pipe forms, when in normal position, a closed joint at 61, with a shoulder on the internal shaping-plunger or piercing-pin 58 until after the blank has been carried down into the blow-mold. During this downward movement of the blank an arm 62, connected to the outlet-pipe, passes down along a straight portion of a slot 63, formed in the supporting-standard 2. As soon as the blank is within the blow portion of the mold, and therefore fully expanded, the arm 62 will be shifted by an inclined or offset portion of the slot, thereby rotating the outlet-pipe. By this rotation of the outlet-pipe the latter is caused to move down by reason of inclined flanges 64 on the outlet-pipe moving along similarly-inclined grooves 65 in the neck-forming sections 45, thereby permitting the escape of fluid-pressure from the blown article. By the entrance of air under pressure into the blank during the movement down of the blank into the blow-mold the latter is expanded to completely fill the blow-mold and brought to final shape. As this expansion is effected the dog 14 on the upper cross-head will strike a lug or projection 66, formed on the collar $17^a$, secured to the guide-rods 17, so that the pawl 14 will be shifted out of engagement with the block 15, thereby permitting the upper cross-head, with its connected parts, to be raised by springs 16. During this upward movement of the upper cross-head an arm $41^a$ on the valve in the pipe 42 will engage the abutment 43 on the rod 44, and thereby close the valve. As the arm 25 passes out of the mold it drops away from stem 20, and by the combined movements of the piston 22, actuated by spring $22^a$, and the arm 25 the ball-valve 27 is moved to normal or open position, permitting any glass to drop out. By the continued downward movement of the lower cross-head the blown article will be withdrawn from the blow-mold through the mold-table, being still held by the neck-forming sections 45. As the lower cross-head continues its downward movement these sections will strike against the block 67, carried by a bracket secured to the mold-table. The apex of the block 67 is in the plane of the division of the sections, so that the latter will fall apart, releasing the pipe $58^a$, when the mold-sections move down into contact with the block. The preliminary movement of lever 52 withdraws the curtain-walls 47; but the connection between the rods 51 and the lever 52 is such that on the continued movement of the cross-head 53 after the sections 45 bear upon the block 67 the lever 52 will move away from the rods 51, as shown in Fig. 34, and the piercing-pin 58 will be drawn out of the article, so that the latter can be removed. The operating-lever is now raised, lifting the shaft 4, the lower cross-head being caused to follow along by its lifting-springs 56. As soon as the cross-head reaches its raised or normal position and the upper ends of the levers 52 pass through the slots $1^a$ in the mold-table the upward movement of the cross-head is arrested. The shaft 4 continues its upward movement, drawing the wedge-block 55 from between the upper ends of the levers 52, and they are drawn to normal position by springs 68, connecting said levers with portions of the cross-head, and thereby lock the cross-head in normal position and complete the upward movement of the mold-sections and their curtained walls and also close the valve in the blast-pipe $58^a$. As the neck-forming sections are raised from the blocks 64 the springs 48 will draw the sections to closed position.

It will be understood by those skilled in the art that the shaping-surfaces of the mold and of the neck-forming sections can be made to conform to any desired contour and that curtains employed during the pressing of the blank can also be changed in accordance with changes in the contour of the article to be produced.

I claim herein as my invention—

1. A machine for shaping glass, having in combination a mold having two shaping-chambers arranged one above the other, upper and lower plungers, means for operating one of said plungers independent of the other and means for operating both plungers simultaneously in the same direction to transfer the article shaped in one chamber to the other chamber, substantially as set forth.

2. A machine for shaping glass, having in combination, a mold having two shaping-chambers arranged one above the other, upper and lower plungers, one of said plungers being provided with a hollow piercing-pin having a connection to a fluid-pressure supply, means for moving one of said plungers independent of the other, means for shifting both plungers simultaneously and a valve controlling the flow of fluid-pressure through the piercing-pin, substantially as set forth.

3. A machine for shaping glass, having in combination, a mold having two shaping-chambers arranged one above the other, upper and lower plungers, one of said plungers being provided with a valved outlet for the escape of surplus glass, means for shifting one of said plungers independent of the other, means for closing said valve at or near the end of the movement of said plunger, and means for shifting the plungers simultaneously, substantially as set forth.

4. A machine for shaping glass having in combination a mold, a plunger provided with a hollow piercing-pin and having two passages, one connected to a fluid-pressure supply and open to the air, said passages having outlet and inlet openings respectively, in the portion of the pin inclosed by the glass and controllable to be closed, substantially as set forth.

5. A machine for shaping glass having in combination, a mold having two shaping-chambers arranged one above the other, upper and lower plungers, sections adapted to shape one end of the article carried by one of the plungers, means for shifting said plungers in and out of the mold, and means for opening and closing said sections, substantially as set forth.

6. A machine for shaping glass, having in combination a mold, a pressing-plunger formed of movable sections and means for automatically shifting said sections in accordance with variations in the dimensions of the mold, substantially as set forth.

7. A machine for shaping glass, having in combination, a mold having two shaping-chambers arranged one above the other, upper and lower plungers, means for shifting each of the plungers independently of the other, and means for shifting the plungers simultaneously, substantially as set forth.

In testimony whereof I have hereunto set my hand.

WILLIE M. WOLCOTT.

Witnesses:
DARWIN S. WOLCOTT,
F. E. GAITHER.